A. LARSEN.
HOOF PAD.
APPLICATION FILED AUG. 2, 1913.
1,135,031. Patented Apr. 13, 1915.
2 SHEETS—SHEET 1.
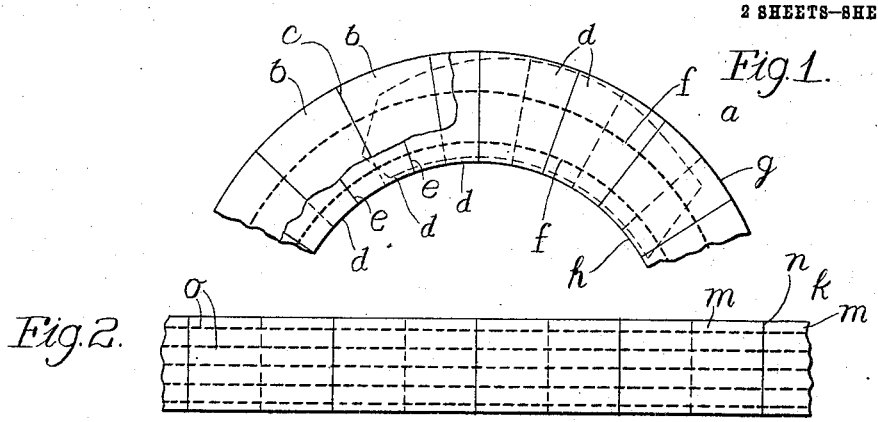
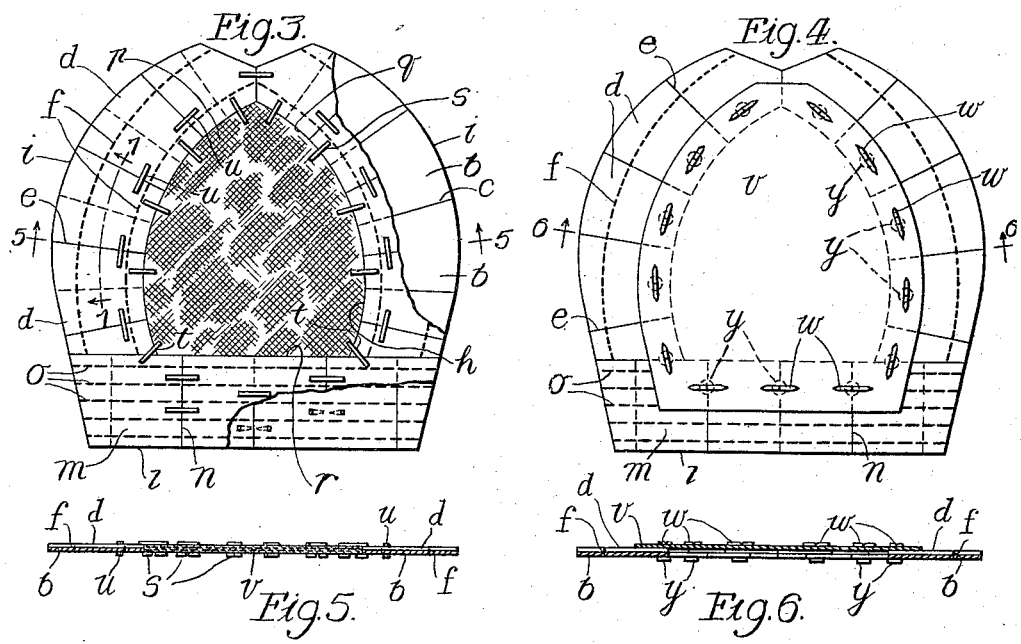
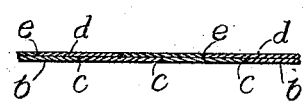
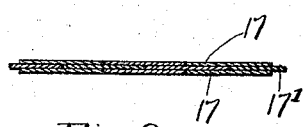
Witnesses:
George C. Higham.
Charles H. Poole.
Inventor
Andru Larsen
by Poole & Cromer
Attys.

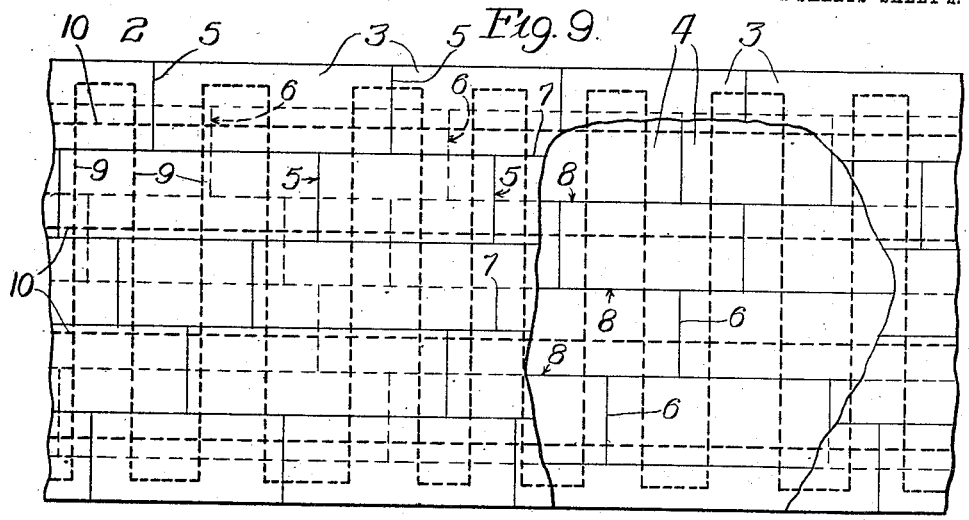
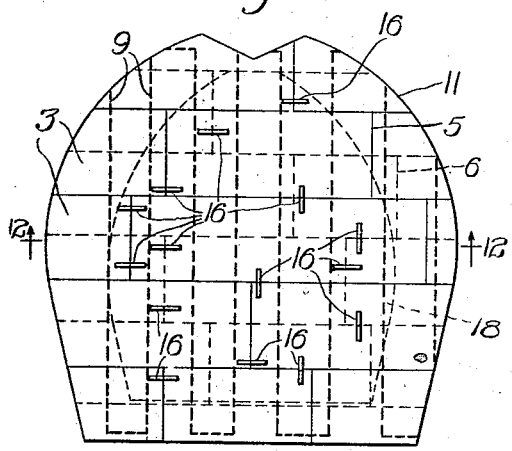
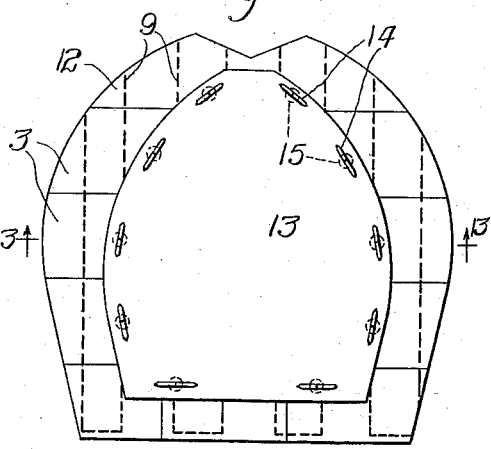

UNITED STATES PATENT OFFICE.

ANDRU LARSEN, OF CHICAGO, ILLINOIS.

HOOF-PAD.

1,135,031.  Specification of Letters Patent.  Patented Apr. 13, 1915.

Application filed August 2, 1913. Serial No. 782,551.

*To all whom it may concern:*

Be it known that I, ANDRU LARSEN, a citizen of the United States, and a resident of Chicago, in the county of Cook and State of Illinois, have invented certain new and useful Improvements in Hoof-Pads; and I do hereby declare that the following is a full, clear, and exact description thereof, reference being had to the accompanying drawings, and to the letters of reference marked thereon, which form a part of this specification.

This invention relates to that class of hoof pads comprising a plurality of layers of flexible material formed of a multiplicity of sections having their adjacent edges in abutting engagement with each other and all secured together so as to form a pad adapted to be interposed between a hoof and shoe.

The principal object of the invention is to provide a simple, economical, and efficient hoof pad.

Other and further objects of the invention will appear from the following description and claims and from an inspection of the accompanying drawings which are made a part hereof.

The invention consists in the features, combinations, and details of construction herein described and claimed.

In the accompanying drawings, Figure 1 is a face view of a blank or strip of flexible material made in accordance with my invention and from which blank the rim or side members of my improved hoof pad are cut. Fig. 2, a face view of a strip of flexible material comprising a plurality of layers each formed of a multiplicity of sections having their edges in abutting engagement with each other, the layers being stitched together and forming a sheet or strip of flexible material adapted to enable heel members or transverse end portions of horseshoe or hoof pads to be cut therefrom; Fig. 3, a face or plan view of a horseshoe pad constructed in accordance with my invention and comprising curved side or rim members, each formed of a plurality of layers comprising a plurality of overlapping sections secured together and having a central or body member formed of flexible material and a transverse or heel member, the outer edges of the central member being secured in abutting engagement with the inner edges of the side and heel members, respectively; Fig. 4, a similar view of a horseshoe pad comprising side or rim members formed of a plurality of layers of flexible material each comprising a plurality of overlapping sections having their edges in abutting engagement and having a transverse or heel member of flexible material and a metallic plate, the outer marginal portions of which are secured to the flexible side and heel members; Fig. 5, a transverse sectional view, taken on line 5 of Fig. 3, looking in the direction of the arrows; Fig. 6, a similar transverse sectional view, taken on line 6 of Fig. 4 looking in the direction of the arrows; Fig. 7, a sectional view, taken on line 7 of Fig. 3 looking in the direction of the arrows; Fig. 8, a sectional view of a three-ply strip or sheet of leather formed of overlapping sections having their adjacent edges in abutting engagement and all sewed together; Fig. 9, a face view of a sheet or strip of flexible material formed of a plurality of layers of leather, each comprising a multiplicity of sections having their adjacent edges in abutting engagement, said layers being secured together by means of stitches and forming a sheet of material adapted to enable horseshoe pads to be cut therefrom; Fig. 10, a face view of a completed horseshoe pad as it would appear after being cut from a sheet of material such as that shown in Fig. 9, and after having staples inserted at suitable intervals to connect the sections of the respective layers of which the pad is formed; Fig. 11, a similar view of a horseshoe pad as it would appear when formed of a sheet of material such as that shown in Fig. 9 when provided with a central shield or metallic plate; Fig. 12, a transverse sectional view, taken on line 12 of Fig. 10 looking in the direction of the arrows; Fig. 13, a transverse sectional view, taken on line 13 of Fig. 11 looking in the direction of the arrows; and Fig. 14, a view in section of a hoof pad comprising a plurality of sectional layers of leather connected by stitches and cemented together by means of rubber cement or waterproof cementitious material and provided with a metallic plate riveted thereto.

In the art to which this invention relates, leather is a very desirable material from which to manufacture hoof pads. In view of the fact, however, that leather, when in pieces of sufficient dimensions to enable an entire hoof pad or even the side or end members of a hoof pad to be constructed from a single piece, is very expensive, it becomes very desirable to provide a hoof pad made in accordance with this invention and comprising strips or sheets of leather formed of a multiplicity of connected sections of such small dimensions that a pad of the desired material is obtained which is much less expensive than any which could be formed of a single piece of leather or even of pieces of leather of sufficient dimensions to form an entire side or end member or an entire layer or ply.

In constructing a horseshoe pad or hoof pad in accordance with my invention and comprising side and end portions or rim and heel members composed of leather, I provide a strip or blank $a$, such as is shown in Fig. 1 comprising a plurality of layers of flexible material, preferably leather, one of said layers comprising in its construction a multiplicity of sections $b$ arranged with their adjacent edges $c$ in abutting engagement with each other, and the other of said layers comprising in its construction a multiplicity of similar sections $d$ arranged in overlapping engagement with the sections $b$ and with their adjacent edges $e$ in abutting engagement with each other, the sections $b$ and $d$ being so arranged with respect to each other as to break joints, or, in other words, arranged in overlapping engagement with each other and with the edges of the sections $b$ in staggered relation to the edges of the sections $d$ of the other layer or ply. The layers are secured together by means of stitches $f$ and the blank or strip comprising the overlapping sections $b$ and $d$ is of curved form having an outer curved edge $g$ and an inner curved edge $h$ in approximately parallel relation to each other so as to form a curved strip or sheet of flexible material of any desired length adapted to enable the rims or side members $i$ of any desired number of horseshoe pads, such as those shown in Figs. 3 and 4, to be cut therefrom. The outer curved edge $g$ of the strip or blank has a curvature which is, by preference, slightly larger than the curvature of the outer edge of a finished side or rim member $i$, the inner edge $h$ of the strip being, by preference, parallel with the outer edge so as to form a strip of sufficient width to enable the side or rim members $i$ to be cut therefrom. It will be readily seen that the strip is adapted to be fed progressively into a machine for cutting or stamping out the pads or rim members $i$ progressively and with great rapidity.

A strip $k$ of flexible material, such as that shown in Fig. 2, is provided for enabling the transverse end or heel members $l$ of horseshoe pads, such as those shown in Figs. 3 and 4, to be cut or stamped therefrom. The strip or sheet of material shown in Fig. 2 comprises in its construction a plurality of layers of flexible material, preferably leather, each formed of a plurality of sections $m$, the sections of each layer having their adjacent edges $n$ in abutting engagement with each other and in such position with respect to the corresponding abutting edges of the sections of the other layer or layers of the strip as to break joints, as indicated in Fig. 2. The layers or plies, of which there may be two or more, as desired, comprising the overlapping sections $m$, are secured together by means of rows of stitches $o$ at suitable intervals, in such a manner as to form a continuous strip or sheet of material suitable for enabling transverse or heel members of hoof pads, such as those shown in Figs. 3 and 4, or of a similar character, to be cut therefrom. In making a pad of the form shown in Fig. 3, a central or inner member $p$ is provided which may be of leather or of a cheaper material such as canvas and rubber or cementitious material. When made of canvas and rubber or waterproof material, the central or inner member $p$ is, by preference, made in two layers of canvas cemented together and having rubber or waterproof cementitious material permeating the interstices between the fibers or threads of canvas or fabric of which the layers are formed. The central or inner member $p$, when in the form shown in Fig. 3, has curved side edges $q$ and an end edge $r$ in abutting engagement with the adjacent or corresponding inner edges of the curved rim members or side members $i$ and the heel or end member $l$, the curved marginal edges of the central member $p$ being secured to the inner correspondingly curved edges or inner margins of the rim or side members $i$ by means of staples $s$ or other suitable securing means, and the transverse end margin or edge $r$ of the member $p$ being secured to the inner edge of the transverse or heel member $l$ by means of staples $t$ or similar securing means. The sections $b$ and $d$ of the rim or side members $i$ are also, by preference, connected by means of staples $u$ which connect the adjacent abutting edges of the sections $b$ and $d$, by preference at such points as to enable the staples $u$ to be inside of the inner edge of the shoe when the pad is in position so that the staples will not necessarily come between the shoe and the hoof.

From the foregoing it will be seen that a pad constructed as above described will have flexible rim portions composed of leather adapted to extend between a horse's hoof and shoe, and that the cushion or rim portions of the pad thus adapted to extend between the hoof and shoe may be made of good leather and yet be of such economy of construction as to not render the cost of the pad prohibitive by reason of the value of the material of which it is constructed, as it would be if made of larger pieces or whole leather of equally good quality.

In Fig. 4, a plate or shield $v$ of sheet metal is shown secured to the rim members $i$ and the transverse rim member or heel strip $l$ by means of split rivets $w$ which extend through the overlapping sections $b$ and $d$ and through apertures $y$ in the marginal portions of the plate, so that the plate and the rim members or leather members $i$ and $l$ are securely connected and are adapted to form a hoof pad having flexible rim members or marginal portions which extend between the hoof and shoe when the pad is in use, and having a central portion adapted to form a strong and relatively rigid shield or protecting portion for the frog or central portion of the hoof. The plate $v$ is adapted to be used in combination with the rim members or flexible marginal members $i$ and $l$ whether a flexible central portion or inner member $p$ is employed or not, and the plate or shield $v$ may be used either on the top or bottom side of the pad. I prefer to so construct the metallic plate or shield $v$ and the flexible portions or leather heel and side or rim members that the flexible members will extend laterally and forward beyond the margins of the plate or shield and also, by preference, rearwardly beyond the rear margin of the shield.

In making horseshoe pads such as those shown in Figs. 10 and 11, a strip or sheet 2 of flexible material is provided which in its preferred form consists of two or more layers of leather sewed together, each of such layers comprising a multiplicity of sections having their adjacent edges in abutting engagement, the sections 3 of one layer being so arranged that they overlap the sections 4 of the other layer or layers, and all of the sections being so arranged with respect to each other that they break joints. The adjacent abutting transverse edges 5 of the sections 3 of one layer or ply are intermediate the adjacent abutting edges 6 of the sections 4 of the next adjacent layer or ply, and the abutting edges 7 of the sections 3 of the ply formed by said sections are located intermediate the corresponding abutting edges 8 of the sections 4 of the next adjacent layer or layers. The sections thus arranged break joints both transversely and lengthwise of the strip. The sections 3 and 4 and the plies or layers of leather formed thereby are secured together by means of transverse seams or rows of stitching 9 and by seams or rows of stitching 10 which extend longitudinally of the strip and cross the abutting edges 5 and 6 of the sections of the plies or layers to be connected by such stitching. A continuous flexible sheet or strip of leather is thus formed which is adapted to enable horseshoe pads 11, such as that shown in Fig. 10, or pads 12, such as that shown in Fig. 11, to be cut or stamped therefrom. The strip or sheet is fed progressively into a suitable cutting or stamping machine which may be of any desired type adapted to cut out pads or pad members of the desired size and shape progressively or successively, and which it is deemed unnecessary to describe herein. The pads shown in Figs. 10 and 11 are adapted to cover the bottom of the hoof and to form a continuous pad of compressible material or leather, the marginal members or portions of which are adapted to extend between the hoof and shoe, and the central portion of which is adapted to cover and protect the frog or central portion of the hoof. A central protecting plate or metal shield 13 may be secured to the flexible pad, as shown in Fig. 11, by means of split rivets 14 inserted through the sections of leather and through holes 15 of the plate, such plate being, by preference, so constructed that the marginal portions of the flexible pad member 12 projects forward and laterally beyond the plate on both sides thereof. The heel margin of the flexible member 12 may extend rearward beyond the rear edge of the plate, as shown in Fig. 11, as desired. In cases in which it is found desirable to use the flexible leather pad 11 without a metallic plate, such as a plate 13 or other similar metallic shield, it is advisable to insert a series of staples 16 through the sections 3 and 4 of the plies or layers of leather, so as to securely connect the adjacent abutting marginal edges of the sections and also connect the plies or layers. These staples 16 are, by preference, so disposed as to come on the inside of the inner margin of the shoe when the latter is in position with the marginal portions of the flexible pad extending forward and laterally beyond the staples and adapted to extend between the hoof and shoe. The staples as well as the seams 9 and 10 thus serve to connect the sections 3 and 4 and the plies or layers formed by such connected sections and to, in a measure, protect the central part of the pad from wear.

In making a pad comprising sectional layers of leather stitched together, I prefer to secure a continuous layer or layers of canvas 18, or similar strong flexible material such as a plurality of layers of canvas cemented together by means of rubber cement or cementitious material containing rubber. (See Figs. 10 and 12.) This continuous canvas layer is, by preference, adapted to extend between the leather material and the hoof so that it overlaps and connects a plurality of sections of the next adjacent sectional layer of leather, when the pad is in use. The leather layers, which are secured to the canvas layer by means of rows of stitching or staples or both stitching and staples, as shown in Figs. 10 and 12, are thus adapted to support the leather layers even when the latter are partly worn out and will support the inner layer of leather during the wearing away of the outer or bottom layer and even when the outer layer is worn away.

In Fig. 14, the sectional layers of leather forming a pad such as that shown in Fig. 11 are shown secured together by means of rows of stitches and provided with a layer of rubber cement or waterproof cementitious material 19 between the sectional layers of leather and adapted to render the pad substantially waterproof and to so connect the sections of leather as to form a strong and durable pad.

By arranging the sections of each layer edge to edge in abutting relation or engagement with each other, as herein described and shown, both of said layers will have a plurality of sections the abutting marginal portions of which are overlapped by a continuous unbroken portion of a section of the next adjacent layer. In other words, each layer has a continuous integral portion in overlapping engagement with abutting marginal portions of a plurality of sections of the next adjacent layer, the overlapping sections and the layers of leather formed thereby being joined together by rows of stitching, or by connecting means extending therethrough, and being adapted to be connected with a central member such as that shown in Fig. 3, or with a plate as already described.

In Fig. 8 is shown a strip of leather formed of three plies or layers 17 each comprising a multiplicity of overlapping sections 17' of leather having their adjacent edges in abutting engagement in a manner similar to that already described in connection with Figs. 1 to 6 inclusive.

I claim:

1. A hoof-pad, comprising a plurality of layers of flexible material, each layer consisting of a series of pieces or sections which meet each other edge to edge, each layer having a continuous integral portion extending across the meeting edges of a plurality of pieces or sections of the next adjacent layer, and said layers being permanently connected with each other.

2. A hoof-pad, comprising a plurality of layers of leather, each layer consisting of a series of pieces or sections which meet each other edge to edge, each layer having a continuous integral portion extending across the meeting edges of a plurality of pieces or sections of the next adjacent layer, said layers being permanently connected with each other, a center member, and means for connecting said center member with said layers.

3. A hoof-pad, comprising a plurality of layers of flexible material, each layer consisting of a series of pieces or sections which meet each other edge to edge, each layer having a continuous integral portion extending across the meeting edges of a plurality of pieces or sections of the next adjacent layer, and said layers being secured together by rows of stitching extending through the pieces or sections of said layers.

4. A hoof-pad, comprising two curved oppositely disposed rim members, a heel member extending between and connected with said rim members, each curved rim and heel member consisting of a plurality of layers of flexible material, each layer composed of a series of pieces or sections which meet each other edge to edge, each layer having a continuous integral portion extending across the meeting edges of a plurality of pieces or sections of the next adjacent layer, rows of stitching extending through and securing the pieces or sections of each layer together and securing the layers together, a shield member having its lateral edges abutting against the adjacent inner lateral edges of said rim members, and having its rear edge abutting against the adjacent inner edge of said heel member, and metal fasteners securing the shield member to said rim and heel members.

In testimony, that I claim the foregoing as my invention I affix my signature in the presence of two witnesses, this 30th day of July, A. D. 1913.

ANDRU LARSEN.

Witnesses:
HARRY IRWIN CROMER,
EUGENE C. WANN.